June 21, 1932.  C. L. JONES  1,864,068
MANUFACTURE OF CARBON DIOXIDE
Filed Oct. 4, 1928
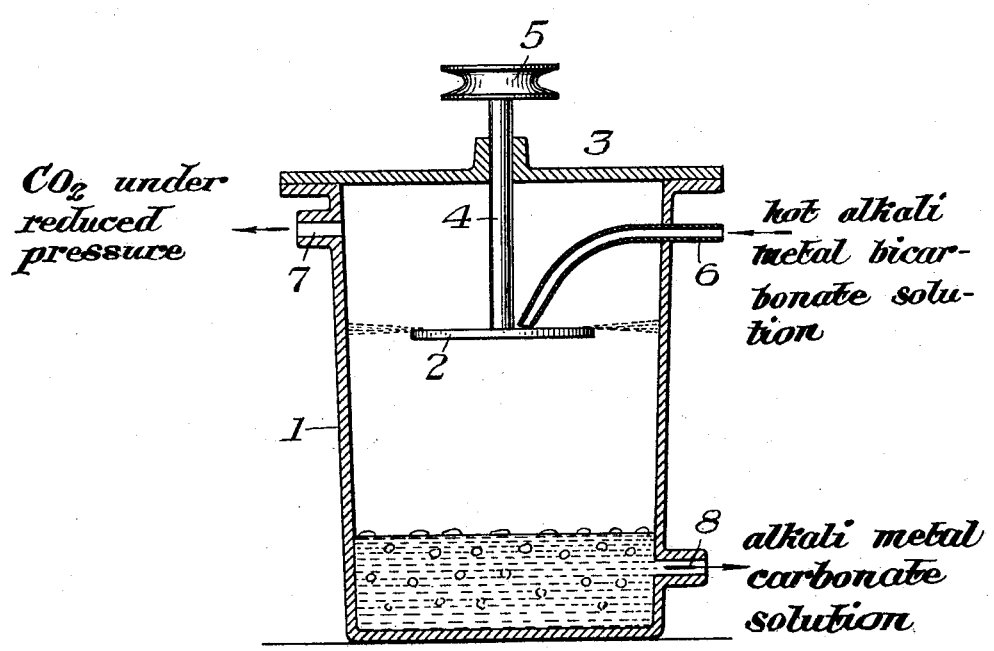
INVENTOR
Charles L. Jones
By Byrnes, Stebbins & Parmelee
his Attys.

Patented June 21, 1932

1,864,068

UNITED STATES PATENT OFFICE

CHARLES L. JONES, OF PITTSBURGH, PENNSYLVANIA

MANUFACTURE OF CARBON DIOXIDE

Application filed October 4, 1928. Serial No. 310,396.

This invention relates generally to the manufacture of carbon dioxide, and more particularly to a method by which the alkali bicarbonate formed by the absorption of carbon dioxide by an alkali carbonate may be boiled to decompose it to a further degree than is obtainable under present methods.

An object of the invention is to increase the recovery of carbon dioxide from the so-called "coke process", and thereby decrease the cost of the gas recovered.

The coke process as ordinarily used in the manufacture of liquefied carbon dioxide is carried out by burning coke under specially designed boilers to produce a maximum percentage of carbon dioxide in the flue gases. These flue gases are then passed through an economizer to reduce their temperature, are given a preliminary scrubbing to further cool them and to remove dust and sulphur dioxide as far as possible, and are then forced upward by a positive pressure blower through large absorbing towers which are commonly filled with coke.

In the absorbing towers the flue gases containing carbon dioxide come in contact with a downwardly flowing solution of alkali carbonate, such as sodium carbonate, potassium carbonate, or a mixture of the two carbonates. The alkali carbonate solution is generally referred to in the art as a lye solution. The lye solution reacts with the carbon dioxide in the flue gases to form alkali bicarbonate, and if sodium carbonate is employed, the reaction is as follows:

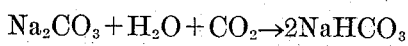
$$Na_2CO_3 + H_2O + CO_2 \rightarrow 2NaHCO_3$$

The lye solution is partly converted to bicarbonate in the absorbing tower and is then pumped through a heat exchanger to a lye boiler where it is boiled by means of exhaust steam to remove a portion of the carbon dioxide contained in the solution, after which it is pumped back to the absorbing towers to absorb a further charge of carbon dioxide from the flue gases. In modern practice the lye boiler commonly is a plate column type of still.

The carbon dioxide evolved from the lye boiler is passed through a condenser, is compressed to approximately 1,000 pounds per square inch, is liquefied in another condenser, and is thereafter filled in cylinders used in manufacturing operations, or it may be converted into solid carbon dioxide.

My invention deals particularly with the treatment of the lye solution which is used in the absorber, the lye boiler, the heat exchanger and the pump, which form a closed circuit in which the lye circulates. In a commercial plant manufacturing carbon dioxide, only part of the carbonate is converted into bicarbonate in the absorber, and only part of the bicarbonate is decomposed to liberate carbon dioxide in the lye boiler. The percentage of lye which is present as bicarbonate varies from time to time in accordance with plant operation and depends upon the manner in which the plant is operated, as well as upon the design of the plant. In general, it may be stated that the upper limit of bicarbonate present in the lye is determined by the percentage of carbon dioxide in the flue gases, which determines the partial pressure of carbon dioxide at the gas inlet of the absorber. The partial pressure of carbon dioxide in the lye can never quite equal the partial pressure of carbon dioxide in the flue gas, since if such were the case there would be no tendency for the carbon dioxide of the flue gases to be absorbed by the lye solution. This is true regardless of the character of the absorbing solution, whether it be sodium carbonate, potassium carbonate, or any other solution. The closeness with which the partial pressure of the carbon dioxide in the lye solution approaches the partial pressure in the flue gases is a measure of the efficiency of absorption. Since in present day plants the partial pressure of carbon dioxide in the lye solution closely approaches the partial pressure of the carbon dioxide in the flue gas, there is little opportunity for raising the upper limit of bicarbonate in the lye solution.

However, the efficiency of the process may be enhanced by increasing the efficiency of the lye boiling operation in order that a greater percentage of bicarbonate may be decomposed than has heretofore been possible. In such a case, the lye solution which is returned from the lye boiler to the absorbing towers is at a relatively low concentration, so that it is possible to absorb a greater quantity of carbon dioxide from the flue gases than has heretofore been possible. This is so because the weakened lye solution from the lye boiler enters the absorbing tower having a lower concentration of bicarbonate than obtains in current plant practice. In current plant practice the lye boiling operation generally is carried far enough to reduce the percentage of alkali present as bicarbonate to about 35 per cent.

It is highly desirable to effect more complete boiling out than in current plant practice, because the partial pressure of carbon dioxide in the exit gas wasted from the absorber is determined largely by the strength of the boiled or "weak lye". The partial pressure of carbon dioxide in the exit gases from the absorber can never become lower than the partial pressure of carbon dioxide in the boiled out lye. The total amount of carbon dioxide produced is limited by the maximum carbon dioxide content of the flue gases produced by the coke boilers, and the proportion of this amount which can be recovered for sale is dependent upon the residual carbon dioxide content of the flue gases leaving the absorber, which in turn is dependent upon the degree to which the lye has been boiled out in the lye boiler.

I attempted to boil out the lye solution under vacuum, but it was found that when a vacuum was employed there was a marked tendency of the lye solution to foam. This tendency toward foaming is greatly increased if traces of soap are formed by the accidental reaction of the lye with small amounts of paint or oil or other fatty material which happen to be present. I have discovered that the " half bound " carbon dioxide in the lye solution behaves very much like dissolved carbon dioxide in water, rather than like chemically combined carbon dioxide. One effect of this behavior is that the rate of removal of carbon dioxide from the lye solution in a vacuum is very strikingly affected by agitation. Violent high speed agitation results in much more rapid removal of carbon dioxide than does a moderate degree of agitation. It has been found, however, that if a hot lye solution is stirred in vacuo, it creates a large volume of foam which is extremely difficult to handle.

I have discovered that this foam can be substantially prevented by dispersing the lye solution in a chamber which is maintained at a lower pressure than the lye boiler. The lye solution can be dispersed in any desired manner, such as by the employment of spray nozzles, but I prefer to disperse it by centrifugal force from the edge of a rapidly rotating disk on which the liquid is fed in such a manner that it is almost immediately dispersed into fine particles which are thrown off into space from the edge of the disk. These droplets or particles of alkali do not form a foam unless the droplets coalesce before the gas has been removed therefrom, and I have found is possible to operate a suitable apparatus in a manner that does not permit such coalescence until sufficient vapor has been removed to insure against foaming.

The single drawing is a view, in cross section, of a flash boiler suitable for carrying out my invention.

Referring to the drawing, the apparatus comprises a vacuum chamber 1 in which is mounted a horizontally disposed rotatable disk 2. The vacuum chamber is provided with a cover 3 through which a spindle 4 which supports the rotatable disk 2 extends. The upper end of the spindle is provided with a pulley 5 which may be rotated by any desired means. The vacuum chamber is provided with an inlet pipe 6 through which a hot lye solution is admitted and delivered to the center of the disk 2. A connection 7 is provided for the vacuum chamber which leads to a vacuum pump and thence to a carbon dioxide compressor. The lower portion of the vacuum chamber is further provided with an outlet pipe 8 for drawing off the boiled lye solution and returning it to the carbon dioxide absorber for the further absorption of carbon dioxide.

In the operation of the apparatus, a hot lye solution is admitted through the pipe 6 and deposited adjacent the center of the rotating disk 2. The disk is rotated at a high speed so that through the action of centrifugal force the solution flows to the edge of the disk and is projected through space in the form of fine particles which allow the carbon dioxide to separate therefrom and to flow from the tank through the pipe 7. The particles of lye solution do not coalesce until sufficient time has elapsed to allow the carbon dioxide gas to separate therefrom, after which the particles flow down the sides of the vacuum chamber and are delivered through the pipe 8 to the carbon dioxide absorber for further use.

If desired, I may employ more than one of these vacuum flash boilers in series, operating them at different pressures. This is advisable where the foaming tendency is too severe to boil out sufficient gas in one stage, so that by operating several stages at increasing degrees of vacuum, I limit the tendency to foam in the first stages, since only part of the gas is there removed. If desired, these stages may all be contained in a single shell and the disks may be mounted on a common shaft.

Where it is desired to adapt plants which are already in existence for utilizing my invention, I prefer not to replace the boilers which are in common use, but merely to employ a flash boiler of the type described herein in series with the existing lye boiler, and treat the weak lye coming from the usual lye boiler in accordance with the method above described. A comparatively small vacuum flash boiler arranged in this manner will remove considerable carbon dioxide from the weak lye, thus rendering the lye capable of reducing the carbon dioxide content of the exit gases from the absorber to a lower point than is possible without the utilization of my device.

The effectiveness of my flash boiler for eliminating the foaming difficulty makes it possible to modify the type of lye solution which is employed in the process by the deliberate addition of a foaming agent, such as saponin, pine oil, or even sodium soaps thereto. Such foaming agents can be used to create a foam or froth of fine bubbles in the absorber, resulting in greatly increased absorbing surface, and the bicarbonate solution thus formed can be successfully boiled out without fear of excessive frothing or boiling over. The use of a foaming agent to increase the absorption of carbon dioxide in the absorber can only be employed in connection with the utilization of my invention, since if foaming agents were employed in the usual system in which the lye is boiled out in the ordinary type of lye boiler, it would be impossible to accomplish the boiling out step because of the formation of excessive foam.

The use of frothing agents such as above referred to also makes it possible to decrease the size of the absorbing tower and to merely employ a series of chambers in which the flue gases are dispersed as fine bubbles in the lye solution, either by means of agitators, or by introducing the gas through a porous plate or septum, or by employment of any of the devices known in the art for dispersing gases in liquids.

The high cost of pumping large volumes of gases at very low pressures is a factor to be considered in the practice of my invention, and in order to decrease the cost I prefer to boil the strong lye solution from the absorbing tower in a column still according to the practice of the prior art, and to thereafter treat the weak lye solution to obtain further carbon dioxide therefrom by means of the flash boiler herein described.

In describing the present preferred method of practicing my invention, and the apparatus which I prefer to employ, I have used the term "vacuum flash boiler" to designate the chamber 1 shown in the drawing. By the employment of this term, it is not intended to limit the invention to the use of a vacuum chamber for dispersing the lye solution into particles and separating carbon dioxide therefrom. Where my invention is used in connection with lye boilers of the type now in common use, it is only necessary to maintain the chamber 1 at a lower pressure than the lye boiler so that as the lye solution is dispersed into particles, the carbon dioxide will be separated from the solution. My invention contemplates dispersing a lye solution by any desired means, into a chamber maintained at a lower pressure than the lye boiler, whether the pressure in the dispersing chamber is equal to, less than, or above atmospheric pressure.

If the flash boiler is used as a substitute for the ordinary lye boiler, and the lye solution delivered from the carbon dioxide absorbing tower to the flash boiler, the flash boiler is maintained at a lower pressure than the absorbing tower.

In either case, the lye solution is flowed from a container in which the temperature and pressure are such as to prevent evolution of carbon dioxide into a container having a lower pressure where the solution is dispersed into small particles.

While I have described in detail the preferred method of practicing my invention, and have illustrated and described an apparatus which is suitable for carrying out my invention, it should be understood that the invention may be otherwise embodied without departing from the spirit of the invention or the scope of the following claims.

I claim:

1. In the method of purifying carbon dioxide wherein carbon dioxide gas is absorbed in an absorption chamber by a solution of alkali carbonate to form alkali bicarbonate and the bicarbonate solution is thereafter decomposed, the step which comprises dispersing the hot bicarbonate solution into small particles at a lower pressure than the pressure in the absorption chamber.

2. In the method of purifying carbon dioxide wherein carbon dioxide gas is absorbed in an absorption chamber by a solution of alkali carbonate to form alkali bicarbonate and the bicarbonate solution is thereafter decomposed, the step which comprises dispersing the hot bicarbonate solution into particles in a chamber maintained at a lower pressure than the pressure in the absorption chamber by projecting the liquid into space at high velocity from a rapidly rotating disk.

3. In the method of purifying carbon dioxide wherein carbon dioxide gas is absorbed in an absorption chamber by a solution of alkali carbonate to form alkali bicarbonate and the bicarbonate solution is thereafter decomposed, the steps which comprise adding a frothing agent to the solution of alkali carbonate in the absorption chamber to increase the absorption of carbon dioxide thereby, and dispersing the hot bicarbonate solution into small particles in a chamber having a lower pressure than the pressure in the absorption chamber.

4. In the method of purifying carbon dioxide wherein carbon dioxide gas is absorbed in a solution of alkali carbonate to form alkali bicarbonate and the bicarbonate solution is thereafter decomposed, the steps which comprise partially decomposing the bicarbonate solution by heating under pressure, and then dispersing the hot solution into small particles in a chamber maintained at a lower pressure to further decompose the solution.

5. In the method of purifying carbon dioxide wherein carbon dioxide gas is absorbed in an absorption chamber by a solution of alkali carbonate to form alkali bicarbonate and the bicarbonate solution is thereafter decomposed, the step of preventing the formation of foam during boiling of the bicarbonate solution which comprises dispersing the hot solution into small particles in a chamber having a lower pressure than the pressure in the absorption chamber.

6. In the method of purifying carbon dioxide wherein carbon dioxide gas is absorbed in a solution of alkali carbonate to form alkali bicarbonate and the bicarbonate solution is thereafter decomposed, the steps which comprise heating the bicarbonate solution under pressure while preventing the gases from escaping, and then boiling the hot solution suddenly by dispersing it into small particles in a chamber maintained at a lower pressure.

7. In the method of purifying carbon dioxide wherein carbon dioxide gas is absorbed in an absorption chamber by a solution of alkali carbonate to form alkali bicarbonate and the bicarbonate solution is thereafter decomposed, the step of preventing formation of foam during boiling of the bicarbonate solution, which comprises dispersing the hot solution into particles in a chamber having a lower pressure than the pressure in the absorption chamber by projecting the solution from the edge of a rapidly rotating disk.

8. In the method of purifying carbon dioxide wherein carbon dioxide gas is absorbed by an alkali carbonate to form alkali bicarbonate, the step of preventing formation of foam during boiling of the bicarbonate solution, which comprises dispersing the hot solution into particles by projecting it from the edge of a rapidly rotating disk and under reduced pressure.

9. In the process of purifying carbon dioxide wherein a lye solution containing carbon dioxide gas is used, the steps comprising maintaining a chamber containing the solution under sufficient pressure to prevent evolution of gas, and preventing the formation of foam by dispersing the hot solution into small particles under reduced pressure in order to evolve gas from the separate particles of the solution.

10. In the method of purifying carbon dioxide wherein carbon dioxide gas is absorbed in an absorption chamber by a solution of alkali carbonate to form alkali bicarbonate and the bicarbonate solution is thereafter decomposed, the steps which comprise adding a frothing agent to the solution of alkali carbonate in the absorption chamber to increase the absorption of carbon dioxide thereby, and dispersing the hot bicarbonate solution into small particles by projecting it under reduced pressure from a rapidly rotating disk.

In testimony whereof I have hereunto set my hand.

CHARLES L. JONES.